(12) United States Patent
Seki et al.

(10) Patent No.: US 6,981,410 B2
(45) Date of Patent: Jan. 3, 2006

(54) FLOW SENSOR AND METHOD OF MANUFACTURING THE SAME

(75) Inventors: Koji Seki, Tokyo (JP); Nobuhiko Zushi, Tokyo (JP); Shinichi Ike, Tokyo (JP); Seishi Nakano, Tokyo (JP); Tarou Nakata, Tokyo (JP); Shoji Kamiunten, Tokyo (JP)

(73) Assignee: Yamatake Corporation, Tokyo (JP)

( * ) Notice: Subject to any disclaimer, the term of this patent is extended or adjusted under 35 U.S.C. 154(b) by 97 days.

(21) Appl. No.: 10/434,563

(22) Filed: May 9, 2003

(65) Prior Publication Data

US 2004/0025585 A1 Feb. 12, 2004

(30) Foreign Application Priority Data

May 10, 2002 (JP) ........................................ 2002-135283
Aug. 23, 2002 (JP) ........................................ 2002-243589

(51) Int. Cl.
*G01F 1/68* (2006.01)

(52) U.S. Cl. .................................................... 73/204.26
(58) Field of Classification Search .............. 73/204.26, 73/204.16, 204.17, 204.11, 204.23
See application file for complete search history.

(56) References Cited

U.S. PATENT DOCUMENTS

| | | | |
|---|---|---|---|
| 4,542,650 A | * | 9/1985 | Renken et al. ................. 73/196 |
| 4,888,988 A | * | 12/1989 | Lee et al. ................. 73/204.26 |
| 5,050,429 A | | 9/1991 | Nishimoto et al. |
| 5,233,868 A | | 8/1993 | Coats et al. |
| 5,406,109 A | | 4/1995 | Whitney |
| 5,600,174 A | | 2/1997 | Reay et al. |
| 6,631,638 B2 | * | 10/2003 | James et al. ............. 73/204.26 |

FOREIGN PATENT DOCUMENTS

| | | |
|---|---|---|
| JP | 05-264564 | 10/1993 |
| JP | 07-159215 | 6/1995 |
| JP | 08-166270 | 6/1996 |
| JP | 10-160538 | 6/1998 |
| JP | 2001-153708 | 6/2001 |
| JP | 2001-336958 | 7/2001 |
| JP | 2002-122454 | 4/2002 |
| WO | WO 01/84088 A1 | 8/2001 |
| WO | WO 02 33362 A | 4/2002 |

OTHER PUBLICATIONS

Japanese Office Action issued Feb. 15, 2005.
Japanese Office Action issued Mar. 1, 2005.
State Intellectural Property Office of People's Republic of China, First Office Action to Yamatake Corporation, Application No. 03125149.8 "Flow Sensor and Method of Manufacturing the Same", dated Jan. 21, 2005.
Hirata K et al: "Stainless steel–based integrated mass–flow controller for reactive and corrosive gases", Sensors and Actuators A, Elsevier Sequoia S.A., Lausane, CH, vol. 97–98 Apr. 2000 pp. 33–38.

* cited by examiner

*Primary Examiner*—Max Noori
*Assistant Examiner*—Jewel V. Thompson
(74) *Attorney, Agent, or Firm*—Blakely Sokoloff Taylor & Zafman

(57) ABSTRACT

A flow sensor includes a substrate, an electrical insulating film, and a flow velocity detection mechanism. In the substrate, a diaphragm portion having a first surface in contact with a measurement target fluid and a thick fixing portion surrounding the diaphragm portion are integrally formed. The electrical insulating film is formed on a second surface of the diaphragm portion which is on a side opposite to the first surface. The flow velocity detection mechanism is arranged on the electrical insulating film. A method of manufacturing a flow sensor is also disclosed.

13 Claims, 10 Drawing Sheets

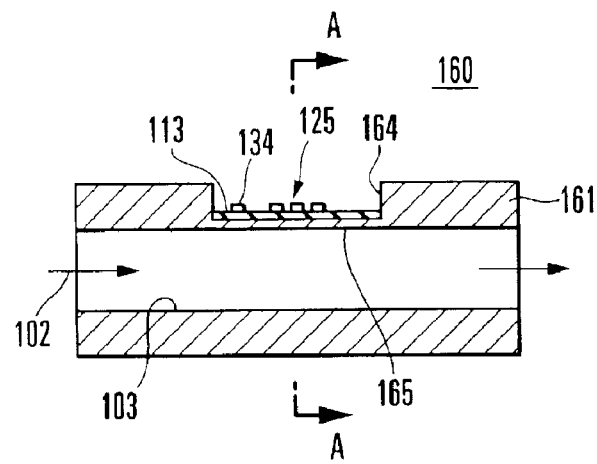 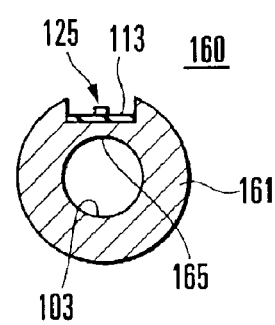
FIG. 8A    FIG. 8B
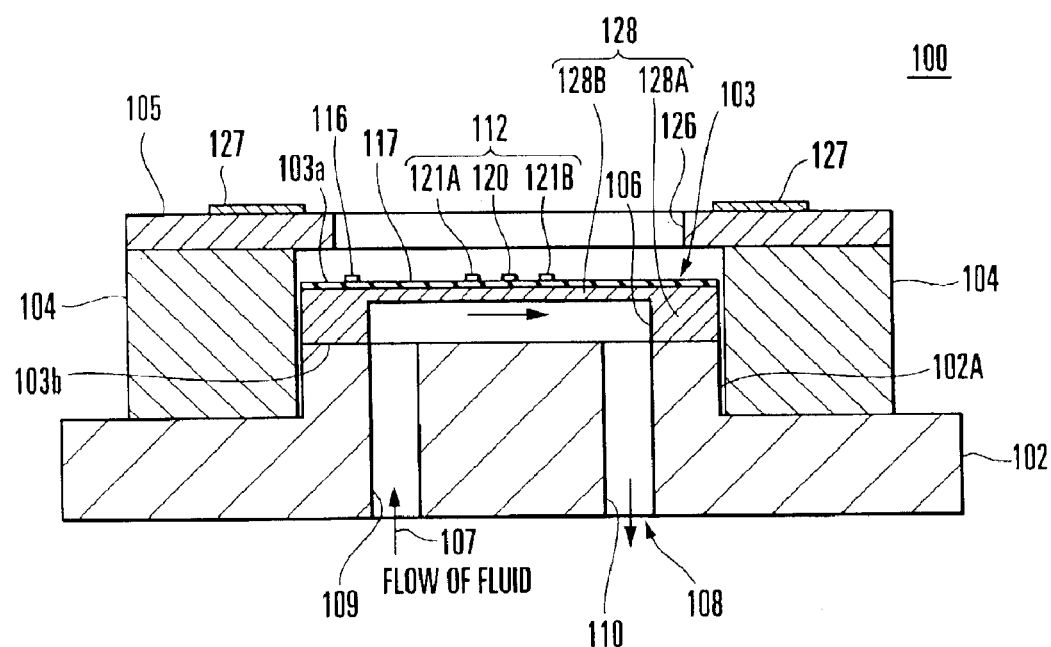
FIG. 9

THE SAME AS FIGS. 12E AND 12F
AND ACCORDINGLY NOT SHOWN

THE SAME AS FIGS. 12E AND 12F
AND ACCORDINGLY NOT SHOWN

FLOW SENSOR AND METHOD OF MANUFACTURING THE SAME

BACKGROUND OF THE INVENTION

The present invention relates to a flow sensor used for measuring the flow velocity or flow rate of a fluid flowing in a channel and, more particularly, a thermal flow sensor.

In a thermal flow sensor for measuring the flow velocity or flow rate of a fluid, a sensor chip having a flow velocity detection mechanism is arranged in a pipe to be parallel to the flow of a fluid to be measured. In the flow velocity detection mechanism, the spatial temperature distribution of a fluid is localized by the flow of heat emitted from a heat-generating body (heater). This localization is detected by a temperature sensor (indirect heated type), or a change in power or resistance occurring when the heat of the heat-generating body is deprived of by the fluid is detected (self-heating type), thus measuring the flow velocity or flow rate (examples: Japanese Patent Laid-Open No. 4-295724, No. 2-259527, No. 8-146026, and the like).

FIGS. 17A and 17B show a conventional flow sensor. This flow sensor 1 has a channel forming member 4 for forming a channel 3 for a fluid 2, a substrate 5 having a peripheral portion bonded to a front opening 4a of the channel forming member 4, and a plate 6 fixed (contact-bonded) to the front surface of the substrate 5 by urging it with bolts or the like through an electrical insulating film 13. In this flow sensor 1, the central portion of the substrate 5 forms a diaphragm portion 5A, and a heat-generating body and two resistors (temperature sensors) for constituting a flow rate detection sensor, and their circuit pattern 7 are formed by the known thin film forming technique.

In the flow sensor 1, the substrate 5 is formed thin, and the rear surface of the substrate 5 is in contact with the fluid 2 to form part of the channel 3 together with the channel forming member 4. As the material of the channel forming member 4 and substrate 5, a material having low thermal conductivity, high heat resistance, and high corrosion resistance, e.g., SUS304- or SUS316-based stainless steel is used.

The plate 6 has a through hole 8 having substantially the same size as that of the diaphragm portion 5A at its center. An electrode 9 is built into the through hole 8. As the electrode 9, one obtained by sealing a plurality of terminal pins 11 in a metal frame 10 with hermetic glass 12 is used. One end of each terminal pin 11 is connected to the circuit pattern 7 by brazing or soldering.

In the conventional flow sensor 1 described above, the plate 6 is merely contact-bonded to the front surface of the thin substrate 5 by fastening with the bolts. Accordingly, the mechanical and thermal contact between the substrate 5 and plate 6 is unreliable and unstable, making the temperature distribution of the diaphragm portion 5A unstable. Upon a pressure change of the fluid 2, when the diaphragm portion 5A of the substrate 5 elastically deforms in the planar direction, the contact state of the substrate 5 and plate 6 changes, and the temperature distribution of the diaphragm portion 5A changes. Then, the flow velocity or flow rate characteristics or the zero point of the sensor shifts, and the precision, reproducibility, reliability, and durability lack.

Particularly, when the interior of the channel is at a negative pressure, the substrate 5 and plate 6 undesirably separate from each other, and the flow velocity or flow rate characteristics of the sensor change largely.

Also, the number of components increases, e.g., the plate 6 and a contact-bonding mechanism for the substrate 5 and plate 6, leading to a large, complicated shape.

SUMMARY OF THE INVENTION

It is an object of the present invention to provide a flow sensor in which a change in flow velocity or flow rate characteristics caused by the pressure change of the fluid is decreased, so that the precision, reproducibility, reliability, and durability are improved, and which can be fabricated with a reduced number of components.

It is another object of the present invention to provide a flow sensor in which zero point adjustment (correction) is performed when the interior of the channel is at a negative pressure or vacuum state, so that it can cope with practical needs in the field of semiconductor manufacturing apparatuses of performing flow rate measurement in a pressurized state.

In order to achieve the above objects, according to the present invention, there is provided a flow sensor comprising a substrate in which a diaphragm portion having a first surface in contact with a measurement target fluid and a thick fixing portion surrounding the diaphragm portion are integrally formed, an electrical insulating film formed on a second surface of the diaphragm portion which is on a side opposite to the first surface, and flow velocity detecting means arranged on the electrical insulating film.

BRIEF DESCRIPTION OF THE DRAWINGS

FIG. 8A is a sectional view showing a flow sensor according to the third embodiment of the present invention;

FIG. 8B is a sectional view taken along the line A—A of FIG. 8A;

FIG. 9 is a sectional view showing a flow sensor according to the fourth embodiment of the present invention;

DESCRIPTION OF THE PREFERRED EMBODIMENTS

The present invention will be described in detail by way of embodiments shown in the accompanying drawings.

Figure 1:
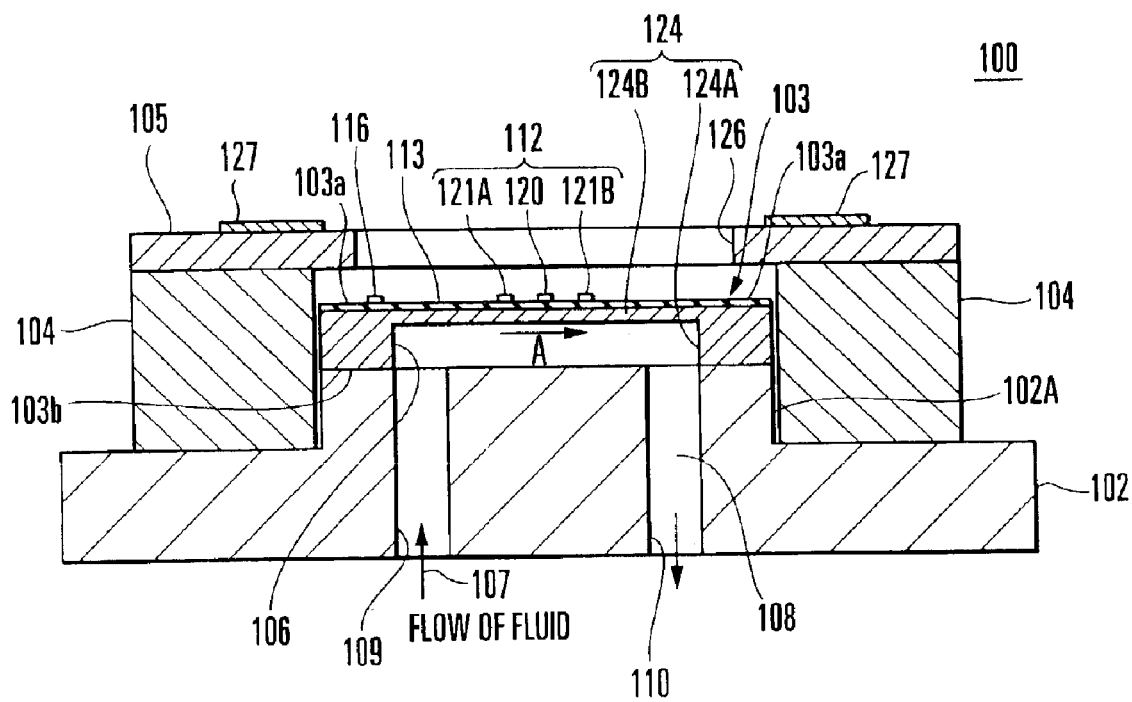
FIG. 1 is a sectional view showing a flow sensor according to the first embodiment of the present invention.
Figure 2:
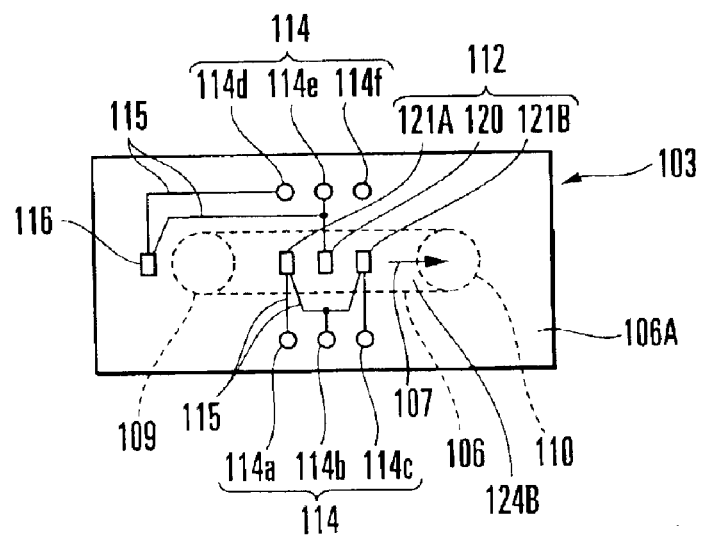
FIG. 2 is a front view of a sensor portion.

FIG. 1 shows a flow sensor according to the first embodiment of the present invention, and FIG. 2 shows a sensor portion. In FIGS. 1 and 2, a flow sensor 100 is constituted by a sensor body 102, a sensor chip 103 arranged on the sensor body (channel forming member) 102, a printed board 105 similarly disposed on the channel forming member 102 through a spacer 104 and located above the sensor chip 103, and the like. The sensor body 102 forms a channel 108 for a fluid 107 together with the sensor chip 103.

The sensor chip 103 is constituted by a substrate 124, a flow velocity detection mechanism 112 formed at the center of the upper surface of the substrate 124 through an electrical insulating film 113, an ambient temperature detection mechanism 116, and the like. The substrate 124 has substantially the same size as that of a projection 102A of the channel forming member 102. The substrate 124 is a thin, elongated rectangular plate, and has a recess 106 at the center of its lower surface. The recess 106 forms a fixing portion 124A with a thick peripheral portion. The fixing portion 124A is bonded to the upper surface of the channel forming member 102.

A thin diaphragm portion 124B is formed on that surface of the substrate 124 where the recess 106 is formed. More specifically, the elliptic recess 106 is formed in the lower surface of the central portion of the substrate 124, thus forming the thin portion 124B. The thin portion 124B has a thickness (plate thickness) of about 50 μm to 150 μm to form a sensor portion having a diaphragm structure. The length (width) of the thin portion 124B in a direction (short-side direction) perpendicular to the flowing direction (direction of an arrow A) is preferably about 1 mm to 3 mm from the viewpoint of the flow strength (pressure resistance).

Although the recess 106 is elliptic, the present invention is not limited to this, and the recess 106 can be circular or rectangular. The thick fixing portion 124A surrounding the diaphragm portion 124B is formed on the upper surface of the projection 102A by, e.g., YAG laser welding. The diaphragm portion 124B has a thickness of about 50 μm to 150 μm, and has the flow velocity detection mechanism 112 at the center of its upper surface. The recess 106 has an elliptic shape which is long in the longitudinal direction of the substrate 124, and communicates with channel holes 109 and 110 at its two ends. The flow velocity detection mechanism 112 is formed on that side of the substrate 124 which is opposite to the recess 106. An upper surface 103a of the substrate 124 is mirror-polished, and the electrical insulating film 113 is formed on it.

As the material of the substrate 124, a material having lower thermal conductivity than that of silicon and high heat resistance, high corrosion resistance, and high rigidity, e.g., stainless steel, sapphire, or a ceramic material is used. Among these materials, as stainless steel is a conductive material, if it is employed to form the substrate 124, the electrical insulating film is formed on it. As sapphire or a ceramic material is an insulating material, if it is employed to form the substrate 124, no electrical insulating film need be formed on it. In the flow sensor 100 according to the first embodiment, the substrate 124 is formed of a stainless steel (particularly SUS316L) thin plate having a thickness of about 0.3 mm to 3 mm.

When the substrate 124 is made of stainless steel, if the thickness of the diaphragm portion (thin portion) 124B which forms the sensor portion is 50 μm or less, the strength decreases, which is not preferable. If the thickness of the diaphragm portion (thin portion) 124B is 150 μm or more, the thermal conductivity in the direction of thickness of the substrate 124, i.e., between the fluid 107 and flow velocity detection mechanism 112 decreases, and the heat transfer amount (heat loss) in a direction parallel to the surface of the substrate 124 increases, which is not preferable. The fixing portion 124A of the substrate 124 serves to keep the shape of the diaphragm portion 124B and as a heat sink.

The recess 106 of the substrate 124 is fabricated by photolithography and etching or end milling, or a composite technique of them. When photolithography and etching are employed, first, a resist is applied to the entire lower surface of a stainless steel wafer by spin coating or the like, or a resist film is adhered to it. The lower surface of the wafer is then irradiated with ultraviolet radiation (or electron beams) to transfer and expose a mask pattern onto the resist. Then, the exposed resist is developed with a developing solution to remove the unnecessary portions of the resist. A negative resist or positive resist is chosen in accordance with whether the exposed portion is to be left or removed. The wafer exposes from the resist-removed portion, and the exposing wafer portion is removed by wet etching or dry etching to a thickness of about 50 μm to 150 μm. Subsequently, the remaining resist is separated and removed, and the wafer is cleaned. Consequently, the thin portion 124B and recess 106 are formed. In the case of wet etching, the wafer is dipped in an etching solution, or an etching solution is sprayed to the wafer, so the resist is dissolved little by little. In the case of dry etching, the lower surface of the wafer is irradiated with ions or electrons by sputtering or a plasma, so the resist is removed little by little, thus fabricating the diaphragm portion 124B and recess 106. When the substrate 124 is made of a ceramic material, the substrate 124 having the recess 106 originally may be calcined.

Of the thin portion 124B, a surface (upper surface) on a side opposite to the side where the fluid 107 flows is mirror-polished, and the electrical insulating film 113 is formed on its entire surface. The flow velocity detection mechanism 112 and ambient temperature detection mechanism 116, which include a plurality of electrode pads 114, e.g., 6 electrode pads 114 (114a to 114f) and thin metal films 115 for wiring, are formed on the upper surface of the electrical insulating film 113 by the known thin film forming technique. For example, the flow velocity detection mechanism 112 and ambient temperature detection mechanism 116 are fabricated by depositing a material such as platinum on the upper surface of the electrical insulating film 113 and etching it into a predetermined pattern.

The flow velocity detection mechanism 112 and ambient temperature detection mechanism 116 are electrically connected to the electrode pads 114 through the thin metal films 115 for wiring. The electrode pads 114 are connected to the electrode terminals of the printed wiring board 105, provided above the substrate 124 through the spacer 104, through bonding wires.

The electrical insulating film 113 is formed of a thin silicon oxide ($SiO_2$) film, silicon nitride film, alumina film, polyimide film, or the like having a thickness of, e.g., about several thousand Å to several μ. The silicon oxide film is formed by sputtering, CVD, SOG (spin on glass), or the like. The silicon nitride film is formed by sputtering, CVD, or the like.

The flow velocity detection mechanism 112 and ambient temperature detection mechanism 116 will be described in more detail with reference to FIG. 2. The flow velocity detection mechanism 112 is formed of a heat-generating body 120 and two temperature sensors 121A and 121B. The heat-generating body 120 is arranged at substantially the center of the thin portion 124B. The two temperature sensors 121A and 121B are arranged to be located upstream and downstream of the heat-generating body 120 in the flowing direction of the fluid 107.

The ambient temperature detection mechanism 116 is used to compensate for a change in ambient temperature, i.e., the temperature of the fluid 107. The ambient temperature detection mechanism 116 is arranged close to the peripheral portion of the diaphragm portion 124B to be further upstream of the upstream temperature sensor 121A. In other words, the ambient temperature detection mechanism 116 is arranged on the upstream side and outside the diaphragm portion 124B. Note that the position of the ambient temperature detection mechanism 116 is not limited to the upstream side, but can be the downstream side, either side of the sensor chip 103 in the widthwise direction, or on the diaphragm portion 124B.

The pattern width of the heat-generating body 120 is preferably about 10 μm to 50 μm, and those of the temperature sensors 121A and 121B and ambient temperature detection mechanism 116 are preferably about 5 μm to 20 μm. If the ambient temperature detection mechanism 116 is adversely affected by heat from the heat-generating body 120, the ambient temperature detection mechanism 116 is not arranged on the thin portion 124B of the substrate 124 but on another portion, e.g., on the thick portion (fixing portion 124A), which is optimal for detection of the ambient temperature. Also, the ambient temperature detection mechanism 116 can be substituted by an external temperature sensor.

The sensor body (channel forming member) 102 is formed of a metal plate of stainless steel which is thin and elongated in the same manner as the substrate 124. The sensor body (channel forming member) 102 also has the protrusion (projection) 102A formed at the center of the surface (upper surface) and having a shape substantially the same as that of the substrate 124, and the two channel holes 109 and 110 which form the channel 108 for the measurement target fluid (to be also referred to as fluid hereinafter) 107 together with the recess 106 of the sensor chip 103. More specifically, the sensor body (channel forming member) 102 has the two through holes 109 and 110. The opening at one end of the through hole 109 and the opening at one end of the through hole 110 are open near the two ends in the longitudinal direction of the projection 102A, and the opening at the other end of the through hole 109 and the opening at the other end of the through hole 110 are open in the lower surface of the channel forming member 102.

The fixing portion 124A of the substrate 124 is bonded to the upper surface of the protrusion (projection) 102A. The through holes 109 and 110 and the recess 106 of the substrate 124 communicate with each other to form the channel 108 for the fluid 107. The shape of the channel 108 need not be elliptic in the recess 106, and a shape with which the flowing direction of the fluid 107 is clear so the fluid 107 flows smoothly is preferable. When such a sensor body (channel forming member) 102 is fabricated from stainless steel which is the same material as that of the substrate 124, the channel forming member 102 and substrate 124 can be welded by YAG laser welding or the like without using any different type of metal. Alternatively, the channel forming member 102 can be made of aluminum, a ceramic material, or the like. In this case, the channel forming member 102 and substrate 124 are bonded to each other by using an O-ring, bolts, or the like.

Even when the channel forming member 102 is made of stainless steel, it may be similarly bonded to the substrate 124 by using an O-ring, bolts, or the like. The printed board 105 disposed on the channel forming member 102 through the spacer 104 has a circular hole at its center, and a plurality of wiring patterns 127 are formed on its upper surface by printing. The electrode pads 114 of the sensor chip 103 are electrically connected to the wiring patterns 127 through bonding wires (not shown). The spacer 104 is made of stainless steel, aluminum, a synthetic resin, or the like in the same manner as the channel forming member 102. The spacer 104 is fixed to the channel forming member 102 with screws, an adhesive, or the like.

Figure 3:
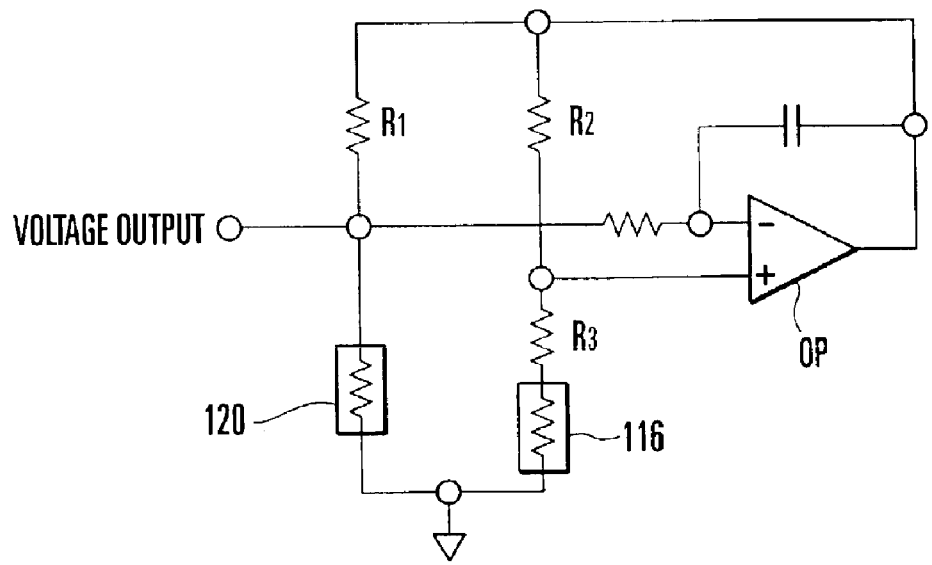
FIG. 3 is a circuit diagram showing a constant temperature difference circuit for the flow sensor.

FIG. 3 shows a constant temperature difference circuit for the flow sensor 100. Referring to FIG. 3, the heat-generating body 120, the ambient temperature detection mechanism 116, and three fixed resistors R1, R2, and R3 form a bridge circuit. The bridge circuit and an operational amplifier (OP1) form a constant temperature difference circuit. The operational amplifier OP1 receives a voltage at the middle point of the bridge circuit, the resistor R1, and the heat-generating body 120 as an inverting input and a voltage at the middle point of the resistors R2 and R3 as a non-inverting input. An output from the operational amplifier OP1 is connected to one terminal of the resistor R1 and one terminal of the resistor R2 in common. The resistances of the resistors R1, R2, and R3 are set such that the temperature of the heat-generating body 120 is constantly higher than that of the ambient temperature detection mechanism 116 by a constant temperature.

Figure 4:
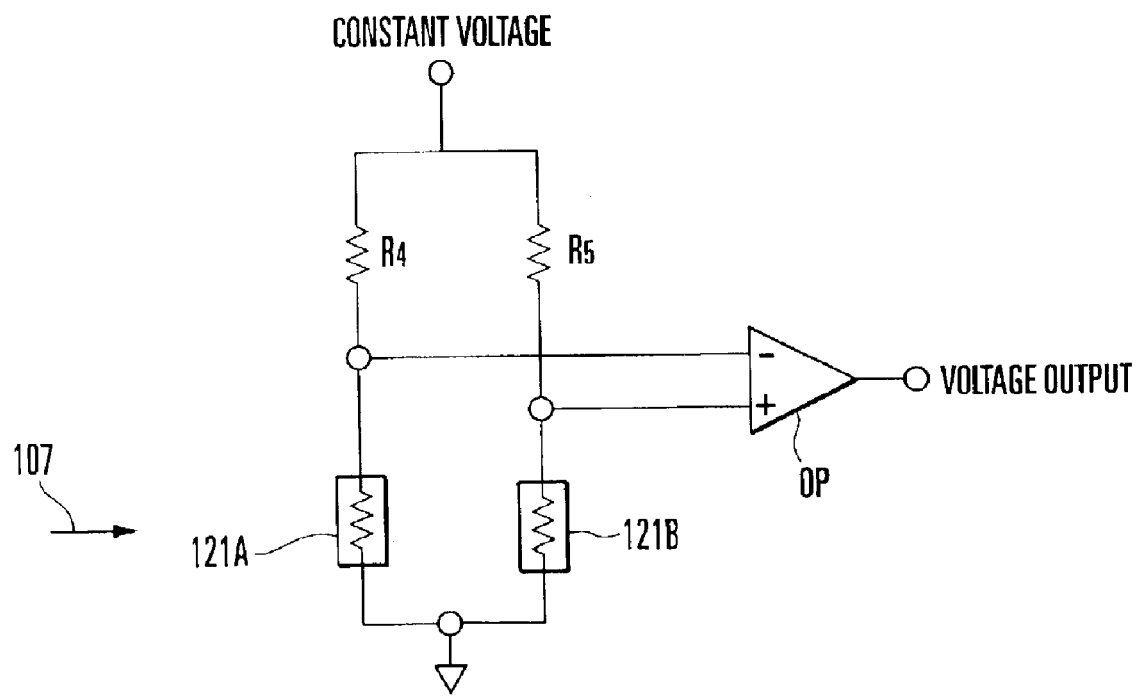
FIG. 4 is a circuit diagram showing a sensor output circuit.

FIG. 4 shows a sensor output circuit for the flow sensor 100. Referring to FIG. 4, the two temperature sensors 121A and 121B and two fixed resistors R4 and R5 form a bridge circuit. The bridge circuit and an operational amplifier OP2 form the sensor output circuit.

In this flow sensor 100, power is supplied to the bridge circuit of the constant temperature difference circuit shown in FIG. 3 to heat the heat-generating body 120 to a temperature higher than the ambient temperature by a certain constant temperature. Then, the fluid 107 is supplied in the direction of arrows of FIG. 1. Consequently, the thin portion 124B is deprived of heat by the fluid 107 proportionally to its flow velocity. Hence, the heat-generating body 120 is also deprived of heat, and its resistance decreases. Accordingly, the equilibrium state of the bridge circuit is lost. A voltage corresponding to a voltage generated between the inverting input and non-inverting input of the operational amplifier OP1 is applied from the operational amplifier OP1 to the bridge circuit.

Therefore, the heat generating amount of the heat-generating body 120 increases to compensate for the heat deprived of by the fluid 107. As a result, the resistance of the heat-generating body 120 increases, and the bridge circuit is restored to the equilibrium state. Therefore, a voltage corresponding to the flow velocity is applied to the bridge circuit which is in the equilibrium state. In the constant temperature difference circuit of FIG. 3, if the sensor is also used by the heater, of the voltages applied to the bridge circuit, the voltage across the heat-generating body 120 can be output as a voltage output.

When the temperature distribution in the vicinity of the heat-generating body 120 is changed by the flow of the fluid 107, a temperature difference occurs between the temperature sensors 121A and 121B located upstream and downstream of the heat-generating body 120. This voltage difference or resistance difference is detected by the sensor output circuit shown in FIG. 4. The temperature difference between the two temperature sensors 121A and 121B is proportional to the flow velocity of the fluid 107. If the relationship between the channel sectional average flow velocity or flow rate and the temperature difference, i.e., the voltage difference or resistance difference detected by the sensor output circuit, is calibrated in advance, the actual channel sectional average flow velocity or flow rate can be measured from the voltage difference or resistance difference. The arrangement of the flow velocity detection mechanism 112 and ambient temperature detection mechanism 116 is not limited to that of the embodiment described above, but can be variously changed. The ambient temperature detection mechanism 116 is arranged at a position where it can detect the fluid temperature without being adversely affected by heat from the heat-generating body 120.

Figures 17A, 17B:
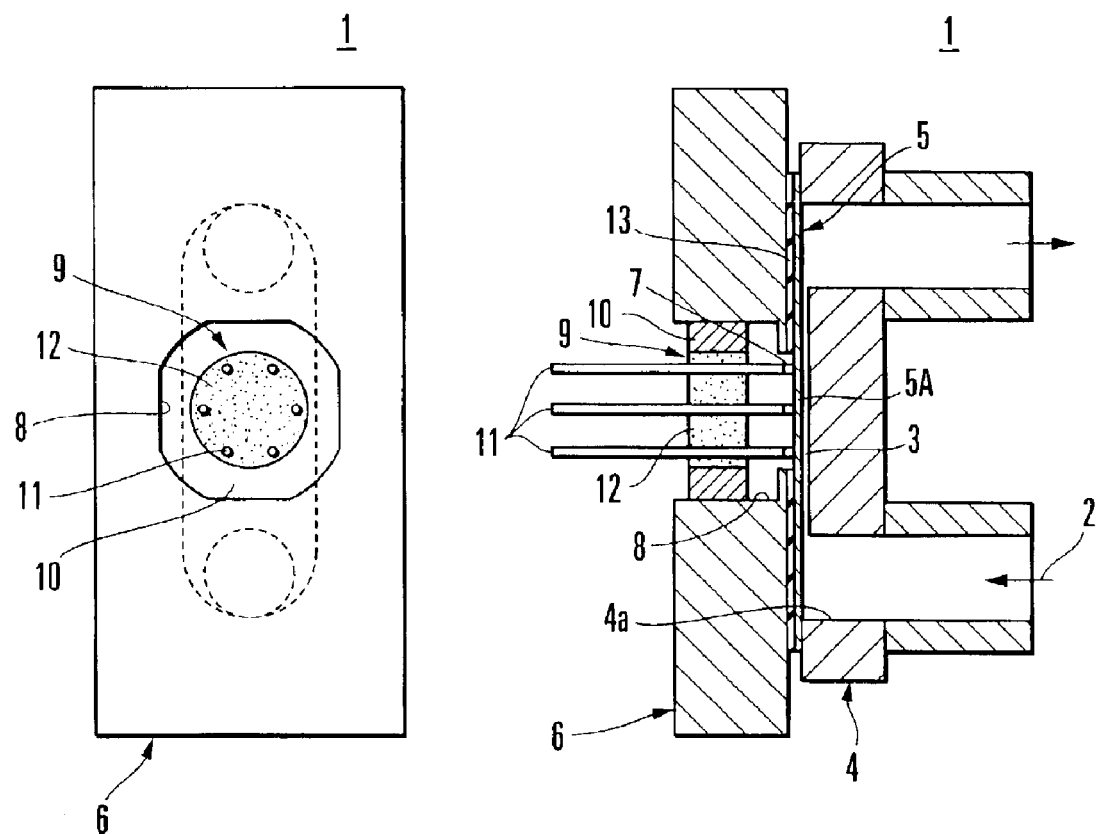
FIG. 17A is a front view showing a conventional flow sensor.
FIG. 17B is a sectional view showing the conventional flow sensor.

With the flow sensor 100 having the above structure, the peripheral portion of the substrate 124 is bonded as the thick fixing portion 124A to the upper surface of the channel forming member 102. The central portion of the substrate 124 forms the thin portion 124B having a diaphragm structure. The flow velocity detection mechanism 112 and ambient temperature detection mechanism 116 are formed on that surface of the diaphragm portion 124B which does not come into contact with the fluid 107. Therefore, unlike in the conventional flow sensor shown FIGS. 17A and 17B, the plate 6 need not be contact-bonded to the substrate 5.

With the flow sensor 100, even if the thin portion 124B elastically deforms upon a pressure change of the fluid 107, no peeling occurs in the flow sensor 100. Compared to the conventional flow sensor 1 shown in FIGS. 17A and 17B, the influence of the pressure on the flow velocity or flow rate characteristics of the sensor decreases, so that the flow sensor 100 can be maintained in a stable state over a long period of time. In particular, since the shift of the zero point is small, high measurement precision can be obtained, and the reliability and durability of the sensor can be improved.

As the substrate 124 is integrally formed of the thick fixing portion 124A and thin portion 124B, even when the thin portion 124B elastically deforms upon a pressure change of the fluid, the position of the fixed end of the fixing portion 124A does not change.

A flow sensor according to the second embodiment will be described.

Figure 5:
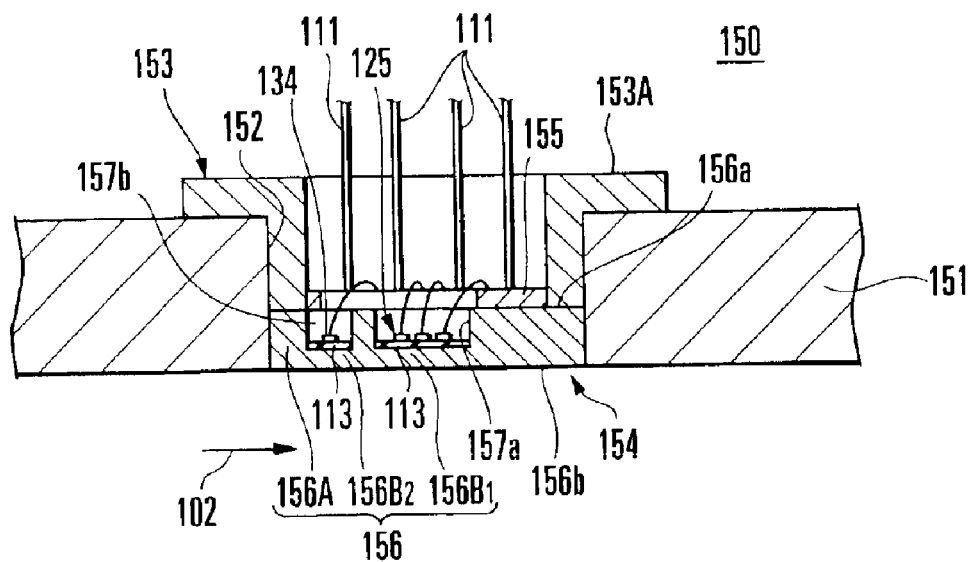
FIG. 5 is a sectional view showing a flow sensor according to the second embodiment of the present invention.
Figure 6:
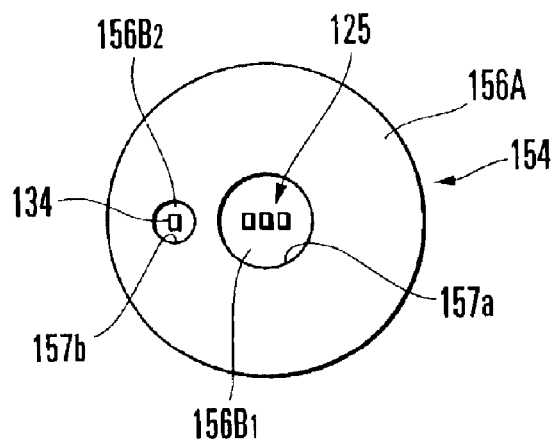
FIG. 6 is a plan view of a substrate.

FIG. 5 shows the flow sensor according to the second embodiment, and FIG. 6 shows a substrate in the flow sensor. In the second embodiment, the present invention is applied to a so-called header type flow sensor.

In a header type flow sensor 150, a sensor chip 154 is externally inserted and fitted in a sensor attaching hole 152 formed in the wall of a pipe 151 through which a fluid 102 flows, and is fixed by welding, or with an O-ring, bolts, or the like. A bracket 153 and the sensor chip 154 form a container. A printed board 155 is accommodated in the container.

The bracket 153 is made of stainless steel into a cylinder with two open ends, and is externally fitted in the sensor attaching hole 152. A flange 153A is bonded to the outer surface of the pipe 151. The sensor chip 154 is bonded to the inner end face of the bracket 153, i.e., to an open end face of the bracket 153 on a side opposite to the flange 153A.

The sensor chip 154 has a substrate 156 made of stainless steel or the like in the same manner as in the first embodiment described above. The substrate 156 is bonded to the inner end face of the bracket 153, and hermetically covers the sensor attaching hole 152 of the pipe 151. First and second recesses 157a and 157b are formed in that surface 156a of the substrate 156 which is on the bracket 153 side. A surface 156b of the substrate 156 which is on a side opposite to the surface 156a forms a contact surface which is to come into contact with the fluid 102 flowing in the pipe 151.

In the flow sensor according to the second embodiment, since the substrate 156 is directly attached in the sensor attaching hole 152 of the pipe 151, no channel forming member is required. Since the substrate 156 can be attached easily even to a pipe with a large diameter, a large flow rate can also be measured.

Those portions of the substrate 156 where the recesses 157a and 157b are formed form thin portions 156B1 and 156B2 having diaphragm structures. The remaining portion of the substrate 156 forms a fixing portion 156A, which is bonded to the inner end face of the bracket 153.

The first recess 157a is formed at substantially the center of the substrate 156, and the second recess 157b is formed upstream of the first recess 157a. Electrical insulating films 113 are formed on the bottom surfaces of the first and second recesses 157a and 157b, and a flow velocity detection mechanism 125 and ambient temperature detection mechanism 134 are formed on them. More specifically, in the second embodiment, the two recesses 157a and 157b are formed to prevent the ambient temperature detection mechanism 134 from being adversely affected by heat generated by the heat-generating body 120 (FIG. 1) of the flow velocity detection mechanism 125, and the flow velocity detection mechanism 125 and ambient temperature detection mechanism 134 are separately arranged in the recesses 157a and 157b. The recesses 157a and 157b preferably have circular shapes each with a diameter of about 1 mm to 3 mm from the viewpoint of strength (pressure resistance), but can have any other shape.

This sensor chip 154 is fabricated in the same manner as in the first embodiment described above. In this case, a projection aligner and direct writing unit are used in photolithography when forming patterns on the upper surfaces of the respective thin portions 156B1 and 156B2 located at the bottom portions of the recesses 157a and 157b. Alternatively, the patterns of the resistors and conductors are directly formed by using a jet printing system.

Figure 7:
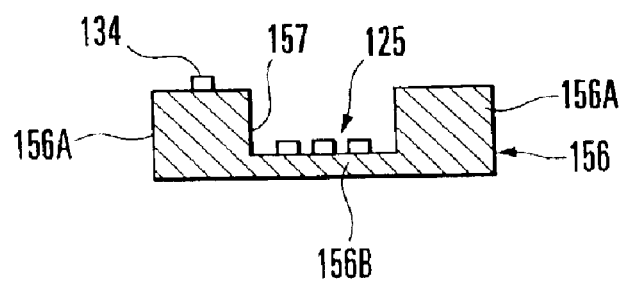
FIG. 7 is a sectional view showing another example of a sensor chip.

According to a modification of the second embodiment, as shown in FIG. 7, one recess 157 may be formed at the center of the substrate 156, and the ambient temperature detection mechanism 134 may be formed on the fixing portion 156A. With the flow sensor 150 having this structure as well, the same effect as in the first embodiment described above can obviously be obtained.

A flow sensor according to the third embodiment will be described.

FIGS. 8A and 8B show the flow sensor according to the third embodiment of the present invention.

In the flow sensor according to the third embodiment, a substrate that constitutes a sensor chip 160 is formed of a stainless steel pipe 161, and the center hole of the pipe 161 is used as a flow channel 103 for a fluid 102.

Hence, the flow channel forming member 102 of the first embodiment described above is not necessary, and the sensor chip itself also serves as a channel forming member. In other words, the sensor chip of the sensor chip 160 and the channel forming member are integrally formed from the pipe 161. The pipe 161 is not limited to one having a circular section, but can be one having a noncircular section such as a rectangular or elliptic section.

The pipe 161 has a recess 164 formed at the central portion in the longitudinal direction of its outer surface. A smaller-thickness portion between the recess 164 and the inner surface of the pipe 161 forms a thin portion 165. The recess 164 is fabricated by etching, machining using an end mill or press, or a composite technique of them.

That surface of the thin portion 165 on a side opposite to the surface to come into contact with the fluid 102 is mirror-finished, and is covered with an electrical insulating film 113. A flow velocity detection mechanism 112 and ambient temperature detection mechanism 116, which include a plurality of electrode pads 114 and thin metal films 115 for wiring identical to those shown in FIG. 2, are fabricated at the center of the upper surface of the electrical insulating film 113 by the known thin film forming technique. When the pipe 161 is made of an insulator such as a ceramic material, the electrical insulating film 113 is not necessary. The ambient temperature detection mechanism 116 may be arranged at the position optimal for temperature detection, or may be substituted by an external sensor.

In the sensor chip 160 having the above structure, one pipe 161 serves as the channel forming member and the substrate for the sensor chip. Hence, no bonding portion is present so the fluid 102 does not leak, and the number of components can be further reduced, so that a flow sensor having high reliability can be fabricated.

A change in flow velocity or flow rate characteristics of the sensor chip which occurs upon a pressure change of the fluid is small. Thus, the measurement precision, reproducibility, reliability, and durability of the sensor can be improved, and fabrication can be done with a reduced number of components.

A flow sensor according to the fourth embodiment of the present invention will be described.

Figure 10:
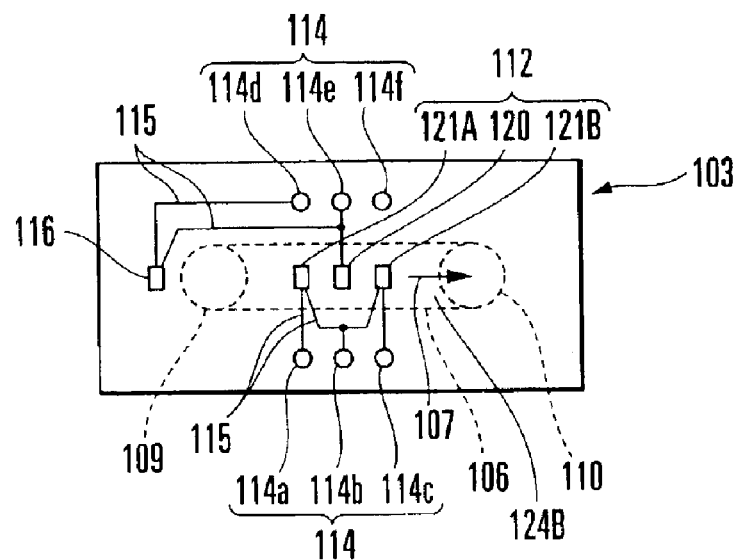
FIG. 10 is a plan view of a sensor chip.

FIG. 9 shows the flow sensor according to the fourth embodiment of the present invention, and FIG. 10 shows a sensor chip. Referring to FIGS. 9 and 10, a description of portions that are common with those of the flow sensor (FIG. 1) according to the first embodiment will be omitted.

A sensor body 102 is formed of a metal plate of stainless steel in the same manner as the flow sensor according to the first embodiment. The sensor body 102 has a projection 102A integrally projecting from the center of its upper surface, and two channel holes 109 and 110 which form a channel 108 for a measurement target fluid (to be also referred to as fluid hereinafter) 107 together with a recess 106 of a sensor chip 103. The channel holes 109 and 110 are formed of through holes. The opening at one end of the channel hole 109 and the opening at one end of the channel hole 110 are open near the two ends the longitudinal direction of the projection 102A in, and the opening at the other end of the channel hole 109 and the opening at the other end of the channel hole 110 are open in the lower surface of the sensor body 102.

The sensor chip 103 forms a rectangular plate having substantially the same size as that of the projection 102A of the sensor body 102. The sensor chip 103 has the recess 106 at the center of its lower surface, so that surface of the sensor chip 103 where the recess 106 is formed forms a thin diaphragm portion 128B. A thick fixing portion 128A surrounding the diaphragm portion 128B is bonded to the upper surface of the projection 102A by YAG laser welding or the like.

The diaphragm portion 128B has a thickness of about 50 $\mu$m to 150 $\mu$m, and has a flow velocity detection mechanism 112 (to be described later) at the center of its upper surface. The recess 106 is an ellipse elongated in the longitudinal direction of the sensor chip 103, and communicates with the channel holes 109 and 110 at its two ends. An upper surface 103a of the sensor chip 103 which is opposite to a passage 108 and where the flow velocity detection mechanism 112 is provided is mirror-polished.

As the material of the sensor chip 103, a material having lower thermal conductivity than that of silicon and has high heat resistance, high corrosion resistance, and high rigidity, more specifically, stainless steel is used. As a general-purpose stainless steel stock fabricated by ordinary melting and refining has many particles and defects, generates a large amount of gas to be emitted, and lacks cleanness, it is not suitable as a chip material for the flow sensor 100 used in a semiconductor manufacturing apparatus or the like.

According to the present invention, a stainless steel stock fabricated by remelting, in accordance with special melting, a stainless steel stock fabricated by ordinary melting and refining is used as the chip material.

A method of manufacturing a stainless steel stock in accordance with special melting includes two types, that is, ① double vacuum melting of vacuum induction melting (VIM) and subsequent vacuum arc remelting (VAR), and ② melting and casting by electroslab remelting (ESR).

According to VIM, a steel lump melted and cast by an ordinary atmospheric melting furnace is remelted by a VIM furnace, and is poured into a cast mold, thus manufacturing a steel lump. According to VAR, an arc is generated between a consumable electrode and molten steel in the cast mold in a water-cooled cast copper mold set in the vacuum state. The electrode is remelted by the generated heat, and the molten steel is continuously solidified in the cast mold, thus manufacturing a steel lump. According to ESR, a steel lump is manufactured while melting an electrode material in a cold cast mold by the resistance heat of a molten slug. According to such special melting, since steel is melted while isolating it from the atmosphere, a high degassing effect can be obtained, so that any oxide-type inclusion (particles) can be removed. As a result, special melting has a characteristic feature in that it can fabricate a highly clean, high-quality steel stock.

The steel lump manufactured by special melting forms a stainless steel stock with a predetermined thickness by forging or hot rolling. The obtained stainless steel stock is further cut into a predetermined size, and an upper surface 103a of the cut piece is mirror-polished and the recess 106 is formed at the center of its lower surface 103b, thus fabricating the stainless steel sensor chip 103 described above.

If the thickness of the diaphragm portion 128B of the sensor chip 130 is 50 $\mu$m or less, the strength decreases, which is not preferable. If the thickness of the diaphragm portion 128B is 150 $\mu$m or more, the thermal conductivity in the direction of thickness of the sensor chip 103, i.e., between the fluid 107 and flow velocity detection mechanism 112 decreases, and the heat transfer amount (heat loss) in a direction parallel to the surface of the sensor chip 103 increases, which is not preferable.

An electrical insulating film 117 is formed on the entire upper surface 103a of the sensor chip 103. The flow velocity detection mechanism 112 and an ambient temperature detection mechanism 116, which include six electrode pads 114 (114a to 114f) and thin metal films 115 for wiring, are formed on the upper surface of the electrical insulating film 117 by the known thin film forming technique. For example, the flow velocity detection mechanism 112 and ambient temperature detection mechanism 116 are fabricated by depositing a material such as platinum on the electrical insulating film 117 and etching it into a predetermined pattern. The flow velocity detection mechanism 112 and ambient temperature detection mechanism 116 are electrically connected to the electrode pads 114 through the thin metal films 115 for wiring.

The flow velocity detection mechanism 112 and ambient temperature detection mechanism 116 will be described in detail.

The flow velocity detection mechanism 112 is comprised of one heat-generating body (resistance heater) 120 and two temperature sensors 121A and 121B, to form an indirect heated type flow velocity detection mechanism. The heat-generating body 120 is arranged at substantially the center of the diaphragm portion 128B. The two temperature sensors 121A and 121B are arranged to be located upstream and downstream of the heat-generating body 120 in the flowing direction of the fluid 107.

The ambient temperature detection mechanism 116 is used to compensate for a change in ambient temperature, i.e., the temperature of the fluid 107. The ambient temperature detection mechanism 116 is arranged on the upstream side and outside the diaphragm portion 128B. Note that the position of the ambient temperature detection mechanism 116 is not limited to the upstream side, but can be the downstream side, either one side in the widthwise direction of the sensor chip 103, or on the diaphragm portion 128B. The pattern width of the heat-generating body 120 is preferably about 10 $\mu$m to 50 $\mu$m, and those of the temperature sensors 121A and 121B and ambient temperature detection mechanism 116 are preferably about 5 $\mu$m to 10 $\mu$m. Furthermore, the diaphragm portion 128B and the thick fixing portion 128A surrounding it may be formed separately, and may be integrated by thermal diffusion bonding or laser welding.

The electrical insulating film 117 is formed of a silicon oxide ($SiO_2$) film, silicon nitride film, aluminum oxide film, polyimide film, or the like having a thickness of about 1 $\mu$m. The silicon oxide film is formed by sputtering, CVD, SOG (spin on glass), or the like. The silicon nitride film is formed by sputtering, CVD, or the like. The thickness of the electrical insulating film 117 can be reduced to about 1 $\mu$m or less because the sensor chip 103 is made of the stainless steel stock manufactured by special melting described above. More specifically, the sensor chip 103 is made of a stainless steel stock fabricated by melting, with vacuum induction, a steel stock melted and cast by ordinary melting, and successively remelting it by a vacuum arc. The stainless steel stock manufactured by this special melting has high cleanness, and less particles and less pinholes than a general steel stock does, so that it can form an electrical insulating film uniformly.

Therefore, the electrical insulating film 117 need not exceed a minimum thickness that can endure a dielectric breakdown voltage. In other words, particles and defects are very few, and the thickness of the electrical insulating film can be reduced. For example, the electrical insulating film 117 may be formed thin within such a range that a breakdown voltage of about 100 V to 500 V and insulation of several 100 M$\Omega$ or more can be secured between the sensor chip 103 and the flow velocity detection mechanism 112 made of a conductor.

A printed board 105 disposed on the sensor body 102 through a spacer 104 has a circular hole larger than the diaphragm portion 128B at its center, and a plurality of wiring patterns 127 for forming a signal processing circuit are formed on its upper surface by printing. Electrode pads 114 of the sensor chip 103 are electrically connected to the wiring patterns 127 through bonding wires (not shown). The spacer 104 is made of stainless steel, aluminum, a synthetic resin, or the like in the same manner as the sensor body 102 is. The spacer 104 is fixed to the sensor body 102 with screws, an adhesive, or the like.

Figure 11:
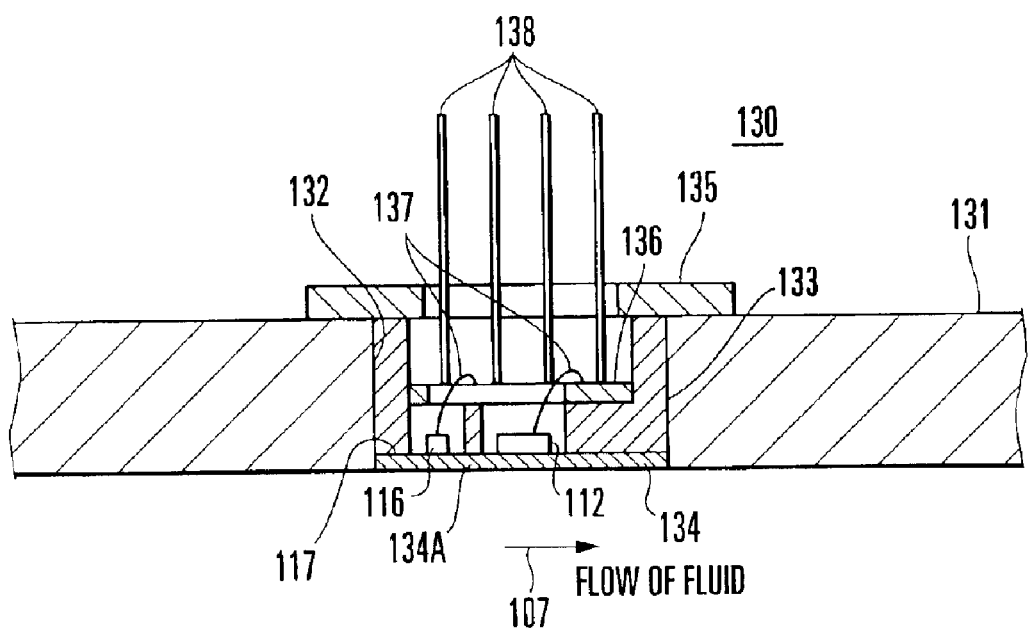
FIG. 11 is a sectional view showing a flow sensor according to the fifth embodiment of the present invention.

A flow sensor according to the fifth embodiment will be described. FIG. 11 shows the flow sensor according to the fifth embodiment of the present invention.

The flow sensor according to the fifth embodiment is a so-called header type flow sensor. A header type flow sensor 130 is externally inserted and fitted in a sensor attaching hole 132 formed in the wall of a pipe 131 through which a fluid 107 flows, and is fixed by welding or the like. A sensor body 133, sensor chip 134, and attaching plate 135 forms a container, and a printed board 136 is accommodated in the container.

The sensor body 133 is made of stainless steel into a cylinder with two open ends, and its lower-surface opening which faces the interior of the pipe 131 is closed with the sensor chip 134. The sensor chip 134 is formed of stainless steel into a thin plate with a thickness of about 50 $\mu$m to 150 $\mu$m. The peripheral portion of the sensor chip 134 is bonded to the lower-surface opening of the sensor body 133 by YAG laser welding or the like, and the bonded portion forms a diaphragm portion 134A. An electrical insulating film 117 is formed on that surface of the diaphragm portion 134A which is on a side opposite to the surface to come into contact with the fluid 107, in the same manner as in the flow sensor according to the fourth embodiment described above. An indirect heated type flow velocity detection mechanism 112 including one heat-generating body (resistance heater) and two temperature sensors, electrode pads, thin metal films for wiring, and an ambient temperature detection mechanism 116 are formed on the electrical insulating film 117.

As the material of the sensor chip 134, a stainless steel stock fabricated by subjecting a stainless steel stock fabricated by ordinary melding and refining to ① double vacuum melting of vacuum induction melting (VIM) and subsequent vacuum arc remelting (VAR), or ② melting and casting by electroslab remelting (ESR), in the same manner as the sensor chip 103 of the fourth embodiment described above, is used. The ambient temperature detection mechanism 116 is arranged such that it can detect the fluid temperature without being adversely affected by heat from the heat-generating body.

Wiring patterns are formed on the printed board 136, and the flow velocity detection mechanism 112 and ambient temperature detection mechanism 116 arranged on the ambient temperature detection mechanism 134 are connected to the wiring patterns through the thin metal films for wiring and electrode pads by wire bonding or the like. The wiring patterns are connected to lead pins 138 for external connection. The attaching plate 135 is integrally formed on the upper surface of the sensor body 133, and its peripheral portion is welded to the wall of the pipe 131. Alternatively, the attaching plate 135 may be attached with screws or the like by using an O-ring. The sensor body 133 and sensor chip 134 may be formed integrally.

In the header type flow sensor 130 with the above structure, the sensor chip 134 is also made of the stainless steel stock fabricated by remelting, with electroslab remelting, a steel lump melted and cast by ordinary melting. Therefore, the sensor chip 134 has very few particles or defects, so that the thickness of the electrical insulating film 117 can be reduced. Obviously, the same effects as those of the fourth embodiment described above can be obtained.

The operations and effects of the flow sensors according to the fourth and fifth embodiments will be described. In the flow sensor according to any one of the fourth and fifth embodiments, the thickness of the electrical insulating film can be sufficiently reduced with high yield, so that the sensitivity and response properties are improved.

Generally, in a sensor chip for a flow sensor, a temperature detection mechanism is fabricated on one surface of a substrate by photolithography and etching. As the material of the substrate, silicon, glass, or the like is usually used. If corrosion resistance and mechanical strength are required, a metal substrate made of stainless steel or the like is used. In this case, as the sensor chip is a conductor, an electrical insulating film is formed on it by an insulating film forming process, and after that a flow velocity detection mechanism made of a conductor is formed on the electrical insulating film. The fourth and fifth embodiments are particularly related to a thermal flow sensor which uses a stainless steel sensor chip.

To form a flow velocity detection mechanism on the surface of a stainless steel substrate through an electrical insulating film, usually, an electrical insulating film such as a silicon oxide film or silicon nitride film is formed by plasma CVD, and a flow velocity detection mechanism is fabricated on the electrical insulating film by photolithography and etching. A general-purpose stainless steel stock as the material of the substrate has many impurities (particles), e.g., $Al_2O_3$ or $SiO_2$, and defects (pinholes) in it and lacks cleanness. To fabricate a sensor having high yields and a high dielectric breakdown voltage, the electrical insulating film must be thick.

As described above, in the flow sensor in which the flow velocity detection mechanism is fabricated on the stainless steel sensor chip, the electrical insulating film is formed on the surface of the substrate by plasma CVD, and the flow velocity detection mechanism is fabricated on the electrical insulating film by photoetching. Generally, as an electrical insulating film has low thermal conductivity, it is preferably formed as thin as possible within such a range that it allows electrical insulation between the sensor chip and flow velocity detection mechanism. However, a sensor chip made of a general-purpose stainless steel stock (e.g., SUS304- or SUS316-based stainless steel) has many particles and defects. To improve insulation between the sensor chip and the flow velocity detector fabricated on it through an electrical insulating film, the electrical insulating film must be thick. In the case of a thermal flow sensor, when the thickness of the electrical insulating film is increased, the heat transfer efficiency in the direction of thickness decreases, and the heat capacity increases. Hence, the sensitivity and response properties of the sensor cannot be improved.

According to the fourth and fifth embodiments, a stainless steel stock fabricated by remelting and casting, in accordance with special melting, a steel lump melted and cast by ordinary melting is used as the material of the sensor chip. Thus, particles and defects from the sensor chip are few. An electrical insulating film which is to be formed on the upper surface of the sensor chip is made thin to a thickness of, e.g., about 1 $\mu$m or less. Then, the heat transfer efficiency of the sensor chip in the direction of thickness is improved, and the heat capacity can be reduced, so that the sensitivity and response properties of the sensor can be improved. A flow sensor suitably used particularly in a semiconductor manufacturing apparatus and ultrahigh-vacuum apparatus can be provided.

A flow sensor manufacturing method according to the sixth embodiment of the present invention will be described.

The flow sensors described in the second to fifth embodiments can also be manufactured with the same manufacturing method.

FIGS. 12A to 12G show a flow sensor manufacturing method according to the sixth embodiment of the present invention. FIGS. 13A to 13C show a method of manufacturing the sensor chip portion of a flow sensor.

Figure 12A:
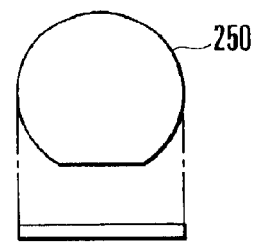
FIGS. 12A to 12G are views showing the steps in a method of manufacturing a flow sensor according to the sixth embodiment of the present invention.
Figure 12B:
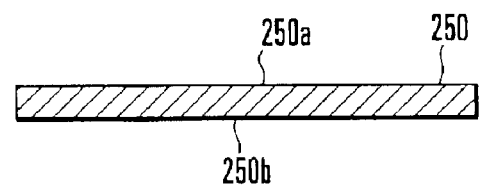
Figure 13A:
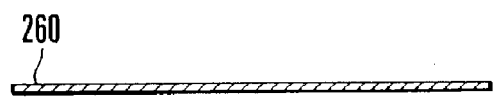
FIGS. 13A to 13C are views showing some steps in a method of manufacturing a flow sensor according to the seventh embodiment of the present invention.
Figure 13B:
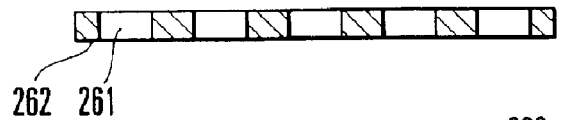
Figure 13C:
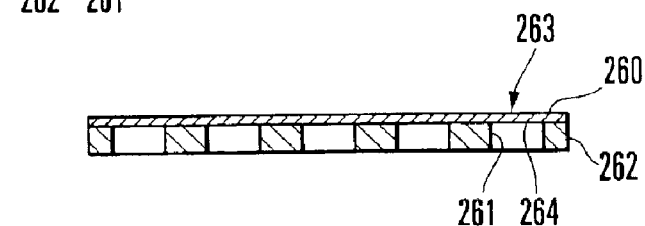

First, a stainless steel substrate material (substrate) (to be referred to as wafer hereinafter) 250 having a thickness of about 0.3 mm to 3 mm is prepared (FIG. 12A), and its surface 250a is mirror-polished (FIG. 12B).

Figure 12C:
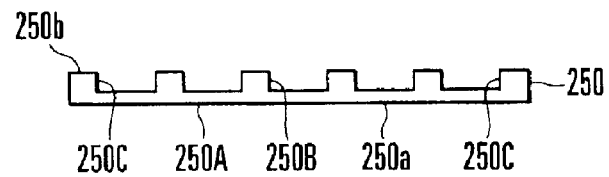

Subsequently, a plurality of thin portions 250A, thick portions 250B, and recesses 250C are formed on the wafer 250 (FIG. 12C). Namely, a channel is formed by half etching, end milling, or the like. Each thin portion 250A and thick portion 250B form the diaphragm portion 124B and fixing portion 124A of the substrate 124 described in the first embodiment. Each recess 250C forms the channel recess 106. The thin portions 250A are formed simultaneously when the recesses 250C are formed in a lower surface 250b of the wafer 250.

The recesses 250C are formed by photolithography and etching or end milling. When photolithography and etching are employed, first, a resist is applied to the entire lower surface 250b of the wafer 250 by spin coating, and the resist-coated surface 250b is irradiated with ultraviolet radiation (or electron beams) to transfer and expose a mask pattern onto the resist. Then, the exposed resist is developed with a developing solution to remove the unnecessary portions of the resist. A negative resist or positive resist is chosen in accordance with whether the exposed portion is to be left or removed. The wafer 250 exposes from the resist-removed portion, and the exposing wafer portion is removed by wet etching or dry etching until the thickness of the thin portions 250A is about 50 $\mu$m to 150 $\mu$m.

Subsequently, the remaining resist is separated and removed, and the wafer is cleaned. Thus, fabrication of the thin portions 250A and channel recesses 250C is completed. In the case of wet etching, the wafer is dipped in an etching solution, or an etching solution is sprayed to the wafer, so the resist is dissolved. In the case of dry etching, the lower surface of the wafer 250 is irradiated with ions or electrons by sputtering or a plasma, so the resist is removed little by little.

Figure 12D:
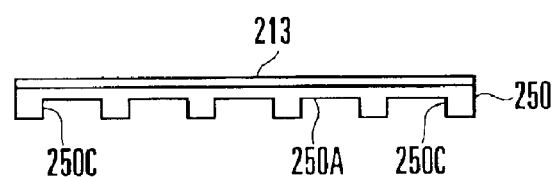

Subsequently, an electrical insulating film 213 formed of a silicon oxide film, silicon nitride film, or a multilayered film comprised of them is formed on the entire upper surface of the wafer 250 (FIG. 12D). When the electrical insulating film 213 is a silicon oxide film, it is formed by sputtering, CVD, SOG (spin on glass), or the like. When the electrical insulating film 213 is a silicon nitride film, it is formed by sputtering, CVD, or the like.

Figure 12E:
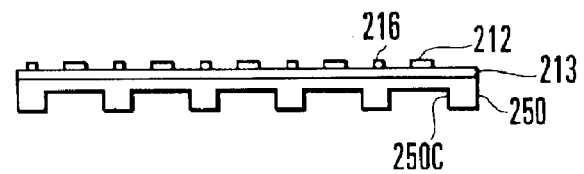

Subsequently, a flow velocity detection mechanism 212 is fabricated, by the known thin film forming technique, on that portion of the electrical insulating film 213 which covers each thin portion 250A, and electrode pads 114, thin metal films 115 for wiring, and an ambient temperature detection mechanism 216 are fabricated around it by the known thin film forming technique (FIG. 12E). Namely, a flow sensor is formed. For example, the flow sensor is fabricated by depositing a metal such as platinum having a large temperature coefficient of resistance on the upper surface of the electrical insulating film 213 and performing photolithography and etching described above.

Figure 12F:
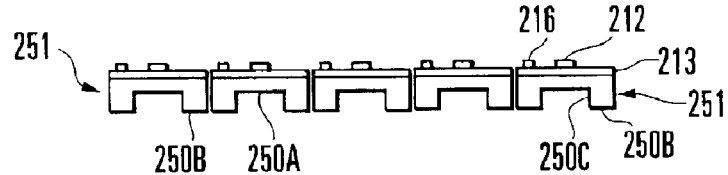

Subsequently, the wafer 250 is cut and separated into the individual flow velocity detection mechanisms 212 by etching, dicing, or the like, to fabricate a plurality of sensor chips 251 simultaneously (FIG. 12F). That is, the sensors are separated by etching and wire cutting or dicing. When cutting the wafer 250, it may be cut at the centers of adjacent thick portions. With this cutting, the wafer 250 forms the substrates 124 each shown in FIG. 1. When the plurality of sensor chips 251 are simultaneously fabricated from one wafer 250 in this manner, sensor chips having a substantially constant quality can be manufactured on the mass production basis, so that the manufacturing cost can be reduced.

Figure 12G:
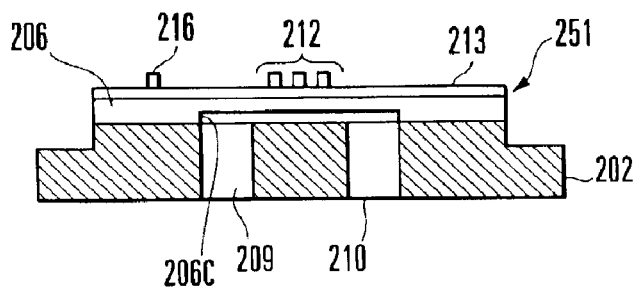

Subsequently, the sensor chip 251 and a channel forming member 202 having two channel holes 209 and 210 are stacked, and are welded by laser welding (FIG. 12G). The substrate 124 shown in FIG. 1 corresponds to a substrate 206 shown in FIG. 12G. After this, a printed wiring board 105 identical to that shown in FIG. 1 is stacked on the channel forming member 202 through a spacer 104, and wiring patterns 127 of the printed wiring board 105 and the electrode pads 114 are electrically connected to each other, to complete the flow sensor 100 shown in FIGS. 1 and 2.

A flow sensor manufacturing method according to the seventh embodiment of the present invention will be described.

FIGS. 13A to 13C show part of a manufacturing procedure employing the flow sensor manufacturing method according to the seventh embodiment of the present invention.

This manufacturing method is different from the manufacturing method of the sixth embodiment only in that the wafer is fabricated by stacking two substrate materials. Except for this, the steps of the seventh embodiment are the same as those of the sixth embodiment.

First, a thin, first stainless steel substrate material 260 with a thickness of about 50 $\mu$m to 150 $\mu$m and having a mirror-finished upper surface is fabricated (FIG. 13A). A second plate-like stainless steel substrate material 262 with a thickness of about 0.3 mm to 3 mm and having a plurality of channel holes 261 is formed (FIG. 13B). The channel holes 261 are formed by etching, end milling, or the like, and are used each as the channel recess 106 of the flow sensor shown in FIG. 1.

Subsequently, the first and second substrate materials 260 and 262 are bonded by diffusion bonding or the like to fabricate a wafer 263 having a multilayered structure. Of the first substrate material 260, portions 264 corresponding to the channel holes 261 of the second substrate material 262 each form the thin diaphragm portion 124B of the substrate 124 of the flow sensor 100 shown in FIG. 1.

With diffusion bonding, the bonding surfaces of bonding members to be bonded are brought into tight contact with each other and heated and pressurized in a vacuum, so they are bonded to each other by utilizing diffusion of atoms generated between the bonding surfaces. Accordingly, no bonding material is needed, and high corrosion resistance can be obtained. Also, with diffusion bonding, variations in thickness of the diaphragm portion of the sensor chip can be minimized. To obtain reliable bonding, the bonding members are preferably heated at an appropriate temperature (about 900° C. to 1,300° C.). In this case, as the first and second substrate materials 260 and 262 are fabricated from stainless steel, no stress is generated by a difference in thermal expansion coefficient.

The manufacturing procedure from FIG. 13C is the same as that of FIGS. 12D to 12G, and a description thereof will accordingly be omitted.

A flow sensor manufacturing method according to the eighth embodiment of the present invention will be described.

Figure 14A:
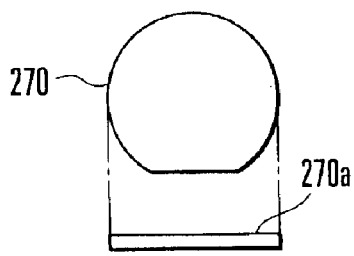
FIGS. 14A to 14C are views showing some steps in a method of manufacturing a flow sensor according to the eighth embodiment of the present invention.
Figure 14B:
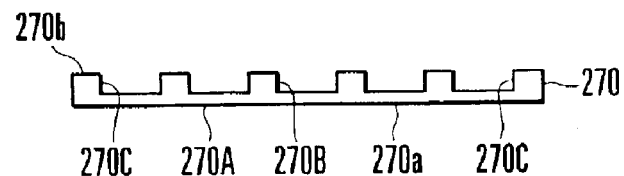
Figure 14C:
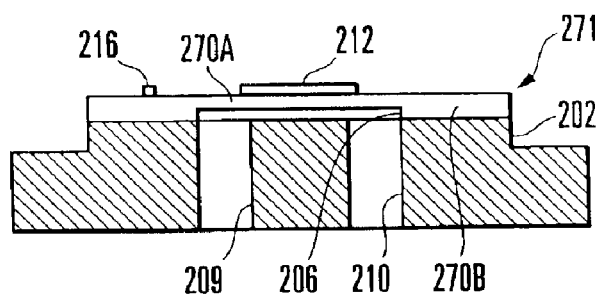

FIGS. 14A to 14C show some steps in a method of manufacturing a flow sensor according to the eighth embodiment. In the flow sensor manufacturing method according to the eighth embodiment, the substrate 124 of the flow sensor 100 shown in FIG. 1 is made of sapphire, and the channel forming member 102 is made of stainless steel.

First, a sapphire wafer 270 with a thickness of about 0.3 mm to 3 mm and having a mirror-polished surface 270a is prepared (FIG. 14A).

Subsequently, a plurality of recesses 270C are formed in a lower surface 270b of the wafer 270 by a laser, end milling, etching, ultrasonic machining, or the like, to form thin portions 270A and thick portions 270B (FIG. 14B). That is, a flow channel is formed. Each thin portion 270A has a thickness of about 50 $\mu$m to 150 $\mu$m.

A flow velocity detection mechanism 212 is arranged on the upper surface of each thin portion 270A of the wafer 270, and electrode pads 114, thin metal films 115 for wiring, and an ambient temperature detection mechanism 216 are arranged around it. These components are fabricated by the known thin film forming technique in the same manner as in the manufacturing method of the sixth embodiment described with reference to FIG. 12E, and accordingly will not be shown or described. In this case, as the sapphire wafer 270 is an insulating material, the electrical insulating film 213 described above need not be formed on the upper surface of the wafer 270 in advance. In this respect, fabrication of the wafer 270 is different from that of the stainless substrate 124.

Subsequently, the wafer 270 on which the flow velocity detection mechanisms 212, electrode pads 114, thin metal films 115 for wiring, and ambient temperature detection mechanisms 216 are fabricated is cut and separated by etching, dicing, laser machining, or the like along the center lines of the thick portions 270B, to fabricate a plurality of sensor chips 271 (FIG. 14C). Each chip 271 and a channel forming member 202 having two channel holes 209 and 210 are stacked and bonded to each other (FIG. 14C). When bonding, the lower surface of the sensor chip 271 is metallized with a metal film of molybdenum, tungsten, or the like in advance, and the sensor chip 271 is bonded to the channel forming member 202 by brazing. After that, a printed board 105 identical to that shown in FIG. 1 is disposed above the upper surface of the sensor chip 271 through a spacer 104, and wiring patterns 127 of the printed board 105 and the electrode pads 114 are electrically connected to each other, thus completing a sapphire flow sensor.

A flow sensor manufacturing method according to the ninth embodiment of the present invention will be described.

Figure 15A:
FIGS. 15A to 15C are views showing some steps in a method of manufacturing a flow sensor according to the ninth embodiment of the present invention.
Figure 15B:
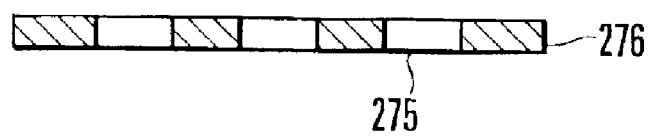
Figure 15C:
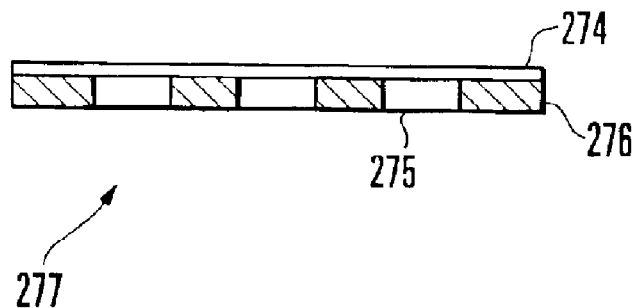

FIGS. 15A to 15C show some steps in a method of manufacturing a flow sensor by diffusion bonding.

With the manufacturing method according to the ninth embodiment, first, a first thin sapphire substrate material 274 with a thickness of about 50 $\mu$m to 150 $\mu$m and having a mirror-finished upper surface is fabricated in the same manner as with the manufacturing method shown in FIGS. 13A to 13C (FIG. 15A). A second plate-like sapphire substrate material 276 with a thickness of about 0.3 mm to 3 mm and having a plurality of channel holes 275 is fabricated (FIG. 15B). The channel holes 275 are formed by laser machining, etching, end milling, ultrasonic machining, or the like, and are used each as the channel recess 106 of the flow sensor shown in FIG. 1.

Subsequently, the first and second substrate materials 274 and 276 are bonded by diffusion bonding or the like to prepare a wafer 277 having a multilayered structure (FIG. 15C). Of the first substrate material 274, portions corresponding to the channel holes 275 of the second substrate material 276 each form the diaphragm portion 124B of the substrate 124 of the flow sensor 100 shown in FIG. 1.

According to this manufacturing method, since the first and second substrate materials 274 and 276 are made of sapphire, no stress is caused by a difference in thermal expansion coefficient. With diffusion bonding, the bonding surfaces of bonding members to be bonded are brought into tight contact with each other and are heated and pressurized in a vacuum, so they are bonded to each other by utilizing diffusion of atoms generated between the bonding surfaces. Accordingly, no bonding material is needed, and high corrosion resistance can be obtained.

A flow sensor manufacturing method according to the 10th embodiment of the present invention will be described. FIGS. 16A to 16D show some steps in a method of manufacturing a flow sensor according to the 10th embodiment of the present invention. In the flow sensor manufacturing method according to the 10th embodiment, the substrate 124 of the flow sensor 100 shown in FIG. 1 and the channel forming member 102 are both made of a ceramic material.

Figure 16A:
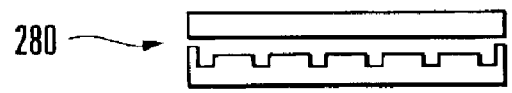
FIGS. 16A to 16D are views showing some steps manufacturing a flow sensor according to the 10th embodiment of the present invention.
Figure 16B:
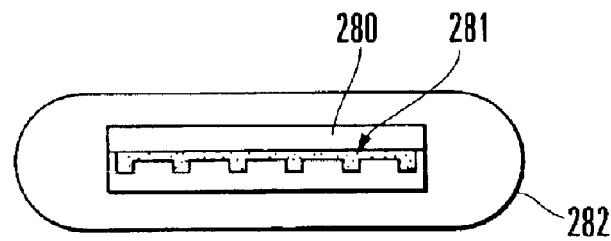
Figure 16C:
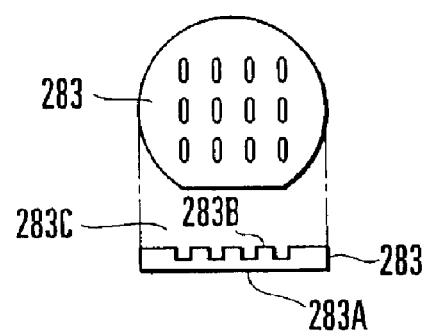

First, a calcining mold 280 for a wafer is prepared (FIG. 16A). A ceramic powder or temporarily molded ceramic member 281 is charged in the calcining mold 280. The calcining mold 280 is then loaded in a calcining furnace 282 and heated and calcined at a predetermined temperature for a predetermined period of time (FIG. 16B), to prepare a ceramic wafer 283. Namely, a wafer with a channel is fabricated by ceramic calcining. The wafer 283 has a thickness of about 0.3 mm to 3 mm, and has a plurality of thin portions 283A, thick portions 283B, and recesses 283C. The thickness of each thin portion 283A is about 50 $\mu$m to 150 $\mu$m. Alternatively, a ceramic member 281 formed by pressing without using the calcining mold 280 may be directly calcined in the calcining furnace 282 to prepare the wafer 283.

Subsequently, the surface of the wafer 283 is mirror-polished. After that, a flow velocity detection mechanism 212 is arranged on each thin portion 283A, and electrode pads 114, thin metal films 115 for wiring, and an ambient temperature detection mechanism 216 are arranged around it. These components are fabricated by the completely same method as that described with reference to FIG. 12E which shows the manufacturing method of the sixth embodiment described above, and accordingly will not be shown or described. In this case, as the sapphire wafer 283 is an insulating material in the same manner as the sapphire wafer described above, no electrical insulating film 213 need be formed on it in advance.

Figure 16D:
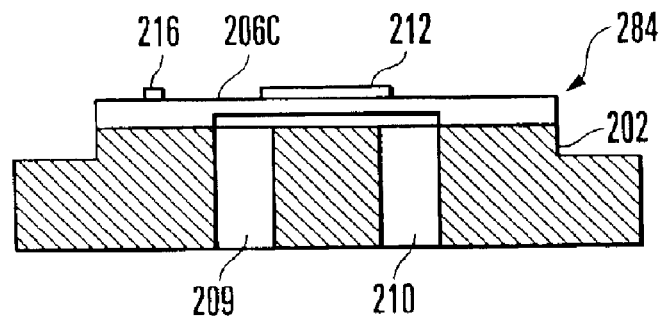

Subsequently, the wafer 283 on which the flow velocity detection mechanisms 212, electrode pads 114, thin metal films 115 for wiring, and ambient temperature detection mechanisms 216 are fabricated is cut and separated by dicing or the like along the center lines of the thick portions 283B, to fabricate a plurality of sensor chips 284 (FIG. 16D). Each sensor chip 284 and a channel forming member 202 having two channel holes 209 and 210 are bonded to each other by brazing or the like after their portions to be stacked to each other are metallized with molybdenum, tungsten, or the like. The channel forming member 202 is made of a ceramic material. Hence, a wafer is fabricated by heating and calcining in the same manner as, e.g., the wafer 283, and thereafter is cut and separated by dicing or the like, thus forming the channel forming member 202. Alternatively, the channel forming member 202 may be fabricated by ordinary machining.

After that, a printed board 105 identical to that of the flow sensor shown in FIG. 1 is disposed above the upper surface of the sensor chip 284 through a spacer 104, and wiring patterns 127 of the printed board 105 and the electrode pads 114 are electrically connected to each other, thus completing a ceramic flow sensor.

In any one of the flow sensor manufacturing methods described in the sixth to 10th embodiments, when the substrate material is either one of stainless steel, sapphire, and a ceramic material, the plurality of sensor chips 251, 271, or 284 with a uniform quality can be fabricated simultaneously by cutting and separating a single wafer into small pieces. Thus, mass production with a batch process is possible to reduce the manufacturing cost.

The present invention is not limited at all to the embodiments described above, but can be variously changed and modified. For example, the materials of the substrate 124 and channel forming member 202 can be changed when necessary. The substrate 124 and channel forming member 202 may be bonded to each other with bolts or the like through a seal member such as an O-ring, or may be adhered to each other through an adhesive or the like. The channel holes 209 and 210 formed in the channel forming member 202 are not limited to through holes extending through the upper and lower surfaces of the channel forming member 202, but may be L-shaped holes extending through the upper and side surfaces of the channel forming member 202. The surface of the substrate material may be mirror-polished after the channel recesses 106 are formed, and the shapes of the channel recesses 106 are not limited to ellipses. The manufacture of the sensor chips is not limited to mass production in accordance with the batch process, but the sensor chips may be fabricated one by one.

The operations and effects of the flow sensor manufacturing methods shown in the sixth to 10th embodiments will be described.

Conventionally, a flow sensor of this type is used mainly for a noncorrosive gas, and recently a sensor which can also be used for a liquid or corrosive gas has been developed. For example, a mass flow sensor disclosed in Japanese Patent Laid-Open No. 7-159215 is known. According to this mass flow sensor, a silicon substrate is bonded to a glass substrate which forms a channel where a fluid flows, to come into contact with the channel. A flow rate detection heater is arranged on that surface of the silicon substrate which is on a side opposite to the channel. In this mass flow sensor, as the heater does not come into direct contact with the fluid, degradation of the heater caused by the fluid can be prevented, and good detection characteristics can be maintained after a long term use.

In the conventional mass flow sensor, however, the channel for the measurement target fluid is fabricated with a silicon substrate and a glass substrate. When the mass flow sensor is to be used in a semiconductor manufacturing apparatus or the like, it cannot because the silicon substrate and glass substrate may be corroded by a corrosive gas or liquid. The silicon substrate has high thermal conductivity. When the temperature of the entire substrate becomes uniform due to heat of the heater, a temperature difference is not easily caused between the upstream and downstream heaters by the flow of the fluid, and the detection sensitivity is accordingly low. In addition, the silicon substrate is formed to be smaller than the glass substrate in order to reduce the heat capacity, and projects above the glass substrate, thus forming a step between the two substrates. This degrades handling and manufacture in the later manufacturing process. For example, regarding the manufacturing facilitation, the silicon substrate is made to be smaller than the glass substrate by removing its unnecessary portions other than a portion that covers the channel of the silicon substrate, by photolithography and etching. Thus, two steps of photolithography and etching are added.

In the flow sensor manufacturing method according to any one of the sixth to 10th embodiments, a plurality of sensor chips can be manufactured on a mass production basis by a batch process, so that the manufacture can be facilitated while the manufacturing cost can be reduced. According to this manufacturing method, chips made from a single body can be originally fabricated by the batch process. Particularly, with the batch process, a plurality of sensor chips with a uniform quality can be manufactured on the mass production basis. Thus, the productivity can be improved and the manufacturing cost can be reduced.

As the substrate and the channel forming member are fabricated from stainless steel, sapphire, or a ceramic material, a flow sensor having high heat resistance and high corrosion resistance can be fabricated, and measurement of a liquid or corrosive gas can be coped with. Particularly, stainless steel is very suitable in terms of corrosion resistance, workability, thermal conductivity, and rigidity. If the corrosion resistance must be particularly high, sapphire is suitable. As the flow velocity detection mechanism does not come into direct contact with the fluid, a sensor having high reliability and high durability can be provided.

With the flow sensor according to the present invention, since a change in flow velocity or flow rate characteristics of a sensor chip caused by the pressure change of the fluid is small, the measurement precision, reproducibility, reliability, and durability of the sensor can be improved, and the sensor can be fabricated with a smaller number of components.

With the flow sensor according to the present invention, a stainless steel stock prepared by remelting and casting, in accordance with special melting, a steel lump melted and cast by ordinary melting is used as the material of the sensor chip. Thus, particles and defects from the sensor chip are few. An electrical insulating film which is to be formed on the upper surface of the sensor chip can be made thin to a thickness of, e.g., about 1 $\mu$m or less. Hence, the heat transfer efficiency of the sensor chip in the direction of thickness is improved, and the heat capacity can be reduced, so that the sensitivity and response properties of the sensor can be improved. A flow sensor suitably used particularly in a semiconductor manufacturing apparatus and ultrahigh-vacuum apparatus can be provided.

With the flow sensor manufacturing method according to the present invention, chips made from a single body can be originally fabricated by the batch process. Particularly, with the batch process, a plurality of sensor chips with uniform quality can be manufactured on the mass production basis. Thus, the productivity can be improved and the manufacturing cost can be reduced. As the substrate and the channel forming member are fabricated from stainless steel, sapphire, or a ceramic material, a flow sensor having high heat resistance and high corrosion resistance can be fabricated, and measurement of a liquid or corrosive gas can be coped with. Particularly, stainless steel is very suitable in terms of corrosion resistance, workability, thermal conductivity, and rigidity. If the corrosion resistance must be particularly high, sapphire is suitable.

As the flow velocity detection mechanism does not come into direct contact with the fluid, a sensor having high reliability and high durability can be provided.

What is claimed is:

1. A flow sensor comprising:
a substrate in which a diaphragm portion having a first surface in contact with a measurment target fluid and a thick fixing portion surrounding the diaphragm portion are integrally formed;
an electrical insulating film formed on a second surface of the diaphragm portion which is on a side opposite to the first surface; and
flow velocity detecting means arranged on the electrical insulating film,
wherein the flow velocity detecting means is disposed through said electrical insulating film on the second surface of the diaphragm portion.

2. The flow sensor according to claim 1, further comprising a channel forming member which forms a channel for the measurement target fluid together with the substrate.

3. The flow sensor according to claim 2, wherein the channel forming member and the substrate are integrally formed.

4. The flow sensor according to claim 1, wherein
the substrate is disposed to cover a sensor attaching hole formed in a pipe through which the measurement target fluid flows.

5. The flow sensor according to claim 1, wherein
the substrate is made of any one material selected from the group consisting of stainless steel, sapphire, and a ceramic material.

6. The flow sensor according to claim 1, wherein
the substrate is made of a stainless steel stock prepared from a steel lump fabricated by melting and casting, and
the second surface of the diaphragm portion is polished.

7. The flow sensor according to claim 6, wherein the stainless steel stock is fabricated by melting and casting the steel lump with vacuum inducting melding and thereafter melting and casting a resultant material with vacuum arc remelting.

8. The flow sensor according to claim 6, wherein the stainless steel stock is fabricated by melting and casting the steel lump with vacuum induction melding and thereafter melting and casting a resultant material with vacuum arc remelting.

9. The flow sensor according to claim 1, wherein the flow velocity detecting means comprises
a heat-generating body and
two temperature sensors.

10. The flow sensor according to claim 1, further comprising
a spacer arranged on the channel forming member, and
a printed wiring board arranged above the substrate through the spacer.

11. The flow sensor according to claim 2, further comprising
a spacer arranged on the channel forming member, and
a printed wiring board arranged above the substrate through the spacer.

12. The flow sensor according to claim 1, further comprising
an electrode pad arranged on the electrical insulating film, and
a thin metal film for wiring for connecting the electrode pad and the flow velocity detecting means to each other.

13. The flow sensor according to claim 1, further comprising
ambient temperature detecting means arranged on the second surface of the diaphragm portion,
an electrode pad formed on the electrical insulating film, and
a thin metal film for wiring for connecting the electrode pad and the ambient temperature detecting means to each other.

* * * * *